United States Patent [19]

Heckel et al.

[11] 4,355,015

[45] Oct. 19, 1982

[54] PROCESS FOR THE PRODUCTION OF FINELY DIVIDED OXIDES OF METALS

[75] Inventors: Emil Heckel, Essen, Fed. Rep. of Germany; Freddy Seys, Brasschaat; Rene Baeckelmans, Willebroek, both of Belgium; Wolfgang Heilmann, Bremen, Fed. Rep. of Germany

[73] Assignee: Degussa Aktiengesellschaft, Frankfurt, Fed. Rep. of Germany

[21] Appl. No.: 157,242

[22] Filed: Jun. 6, 1980

[30] Foreign Application Priority Data

Jun. 7, 1979 [DE] Fed. Rep. of Germany ....... 2923064

[51] Int. Cl.$^3$ ............................................. C01B 33/18
[52] U.S. Cl. ................................. 423/336; 423/241; 423/337; 423/592; 423/612; 423/613; 423/625
[58] Field of Search ............... 423/241, 336, 337, 592, 423/612, 613, 624, 625

[56] References Cited

U.S. PATENT DOCUMENTS

| | | | |
|---|---|---|---|
| 2,665,190 | 1/1954 | Congdon et al. | 423/241 X |
| 3,357,796 | 12/1967 | Howard et al. | 423/241 X |
| 3,896,213 | 7/1975 | Hirdler | 423/241 X |

FOREIGN PATENT DOCUMENTS

| | | | |
|---|---|---|---|
| 2533925 | 2/1977 | Fed. Rep. of Germany . | |
| 51-107278 | 9/1976 | Japan | 423/241 |

*Primary Examiner*—Jack Cooper
*Attorney, Agent, or Firm*—Cushman, Darby & Cushman

[57] ABSTRACT

The residual gas obtained in the pyrogenic production of metal oxides or metalloid oxides contain besides the desired product elemental chlorine if a chlorine containing starting material is employed. After cooling the residual gas the elemental chlorine is reacted to form hydrogen chloride by using an aqueous solution of a reducing agent and in this form the chlorine is subsequently washed out of the residual gas.

9 Claims, No Drawings

PROCESS FOR THE PRODUCTION OF FINELY DIVIDED OXIDES OF METALS

BACKGROUND OF THE INVENTION

The invention is directed to a process for the production of the most finely divided oxides of metals and/or silicon through hydrolytic reaction of the volatile chloride of the metal and/or silicon in a flame, in which case the chloride is supplied in admixture with the gases to be burned and air or oxygen to the flame burning out of a burner into a reaction space and brought to reaction with the formation of water and subsequently the oxide aerosol formed together with the residual gas is allowed to pass through a subsequent cooling system and separated off from the residual gas in separating apparatus.

In the production of finely divided oxides of metals and/or of silicon through the hydrolytic reaction of the volatile chloride of the metal and/or of silicon in a flame there is necessarily formed as a byproduct chlorine gas which must be removed from the residual gas of the reaction.

From German OS No. 2533925 (Degussa) it is known that the chlorine formed in the flame reaction is reduced with hydrogen during the cooling off below the reaction temperature of hydrogen with the oxygen contained in the residual gas.

However, this process has the disadvantage that residual gas obtained therewith still contains up to 300 mg/Nm$^3$ of chlorine. The reduction of this residual chlorine content to a value of <10 mg/Nm$^3$ of chlorine by absorption with caustic soda solution has been found to be barely possible to carry out and uneconomical because of the presence of carbon dioxide.

Carbon dioxide is formed through the use of organochlorosilanes as starting materials and/or through carbon containing fuel gases. The carbon dioxide formed is absorbed in competition to the elemental chlorine so that lower chlorine contents of the residual gas can only be attained by the addition of large amounts of alkali and several absorption devices connected in succession, such as e.g. wash towers.

The problem of the present invention was to reduce the residual chlorine content of the waste gases to a value of <10 mg/Nm$^3$ is an economically replaceable manner.

SUMMARY OF THE INVENTION

The purpose of the invention is to develop a process for the production of finely divided oxides of metals and/or of silicon by the hydrolytic reaction of the volatile metal chloride and/or silicon is a flame wherein the chloride in admixture with combustible gases and air or oxygen under formation of water are supplied to a flame burning out of a burner into a reaction space and brought to reaction, subsequently the oxide aerosol together with the residual gas run through a subsequent cooling system and separated from the residual gas in a separating apparatus wherein the chloride formed in the flame reaction and contained in the residual gas is reacted with an aqueous solution of a reducing agent.

Illustrative volatile chlorides are silicon tetrachloride, aluminum trichloride, titanium tetrachloride, silicochloroform and dichlorosilane.

There can be used as reducing agents, e.g. hydrogen peroxide, sodium hydrogen sulfite or sodium thiosulfate. There can also be employed other known reducing agents. However, the above mentioned reducing agents offer the advantage that they bring with them the least waste water problems.

In a preferred illustrative form of the invention there can be used hydrogen peroxide as the reducing agent in an 0.1 to 1.0 molar aqueous solution. However, there can also be dosed in more highly concentrated solutions, as e.g. 30% hydrogen peroxide in which case the amount is adjusted accordingly.

According to the process of the invention the aqueous solution of the hydrogen peroxide can be supplied to the circulation of a washing tower, e.g. to the suction side of the pump. Thereby there can be fed in 30 to 50 l/hr, preferably 40 l/h of hydrogen peroxide solution (0.5 molar). There can be supplied at the top end of the washing tower 50 to 200 l/h of water having a pH of 6 to 8 while there is delivered at the lower end the process waste gas in an amount of 1,800 to 3,500 Nm$^3$/h, preferably 1,800 to 3,000 Nm$^3$/h. (Nm$^3$/h=normal cubic meters per hours.)

In one illustrative form of the invention the amount of hydrogen peroxide solution added can be so adjusted to the amount of chlorine present in the residual gas that the concentration of hydrogen peroxide after the reaction is 0.05 mole/l in the discharge.

The temperature of the water can be 10° to 30° C. and the temperature of the residual gases can be 30° to 50° C.

The residual gas can have a maximum chlorine content of 300 to 500 mg/Nm$^3$. However, it is possible without doing anything further to work up residual gas with a higher chlorine content. Thus the chlorine content for example can be 1 g/Nm$^3$ in which case then the amount of reducing agent, as e.g., hydrogen peroxide, is adjusted.

In another illustrative form of the invention the reaction of the chlorine with aqueous solution of a reducing agent after a portion of the chlorine is removed by absorption in alkali lye (e.g. aqueous sodium hydroxide.

In a preferred illustrative form of the invention the process of the invention can be carried out after a portion of the chlorine has been reduced with hydrogen during the cooling below the reaction temperature of hydrogen with oxygen contained in the residual gas.

The process of the invention has the advantage that the residual chlorine content of the process waste gas can be brought to a value of less than 10 mg/Nm$^3$.

The process of the invention then can above all be used with advantage if the residual gas contains larger amounts of carbon dioxide, in which case each of the named variants of the process of the invention can be used.

The process of the invention can also be used in an analogous production of metal oxides such as the oxides of titanium or aluminum, e.g. titanium dioxide and alumina or to produce metalloid oxides such as germanium dioxide (e.g. from germanium tetrachloride).

The process can comprise, consists essentially of or consist of the steps set forth with the stated materials.

The following examples further explain and describe the process of the invention.

DESCRIPTION OF THE PREFERRED EMBODIMENTS

Example 1

The residual gas employed was that obtained in the flame hydrolysis of silicon tetrachloride, hydrogen and air to produce finely divided silica (Aerosil),*

*in the same manner as German OS No. 25 33 925 does in Example 1, page 6.

There was fed into the suction side of the pump in the water circulation of the washing tower with a metering pump an 0.5 molar aqueous solution of hydrogen peroxide in an amount of 40 l/h. There were added at the top of the washing tower 100 l/h of water having a temperature of 20° C. and at the lower end of the washing tower there was added residual gas in an amount of 3000 Nm$^3$/h and having a chlorine content of 300 mg/Nm$^3$.

The water discharged from the washing tower had a pH of 0.9 and contained 0.05 mole of $H_2O_2$ and 3.5 grams of HCl per liter.

At the top end of the washing tower the thus treated residual gas only contained 3 mg/Nm$^3$ of chlorine.

Example 2

There was fed into the suction side of the pump in the water circulation of the washing tower with a metering pump an 0.25 molar aqueous $Na_2S_2O_3$ solution in an amount of 40 l/h. There were added at the top of the washing tower 100 l/h of water having a temperature of 20° C. and at the lower end of the washing tower there was added residual gas in an amount of 3000 Nm$^3$/h and having a chlorine content of 300 mg/Nm$^3$.

The water discharged from the washing tower had a pH of 1.9 and still contained 0.04 mole/l of $Na_2S_2O_3$ as well as slight amounts of colliodal sulfur.

At the top end of the washing tower the thus treating residual gas still contained 8 mg/Nm$^3$ of chlorine.

The entire disclosure of German priority application P 2923064.6-41 is hereby incorporated by reference.

What is claimed is:

1. In a process for the production of a finely divided oxide of a metal or silicon or a mixture of such oxides by the hydrolytic reaction of a volatile chloride of the metal or silicon or a mixture of volatile chlorides of the metal and silicon in a flame wherein said chloride is supplied in admixture with the gases to be burned and air or oxygen to the flame burning out of a burner into a reaction space and brought into reaction with the formation of water and subsequently the aerosol oxide formed together with a residual gas containing chlorine is allowed to pass through a subsequent cooling system and separated off from the residual gas in a separatory apparatus the improvement comprising passing the residual gas containing 300 mg/Nm$^3$ to 1 g/Nm$^3$ of chlorine, into an aqueous solution consisting essentially of water and a reducing agent selected from the group consisting of hydrogen peroxide alkali metal hydrogen sulfite, and alkali metal thiosulfate, wherein the chlorine content in the residual gas leaving the solution is reduced to less than 10 mg/Nm$^3$ and the aqueous solution through which the residual gas has passed contains formed hydrochloric acid.

2. A process according to claim 1 wherein prior to being passed into the aqueous solution of the reducing agent a portion of the chlorine in the residual gas is removed by absorption in aqueous alkali solution.

3. A process according to claim 1 wherein prior to being passed into the aqueous solution of the reducing agent a portion of the chlorine in the residual gas is reduced with hydrogen during the cooling below the temperature of reaction of hydrogen with the oxygen contained in the residual gas.

4. A process according to claim 1, 2 or 3 wherein the residual gas that is passed into the aqueous solution of the reducing agent contains carbon dioxide.

5. A process according to claim 4 wherein the reducing agent is hydrogen peroxide, sodium hydrogen sulfite or sodium thiosulfate.

6. A process according to claim 5 wherein the reducing agent is hydrogen peroxide.

7. A process according to claim 6 wherein there is employed 0.1 to 1.0 molar aqueous hydrogen peroxide.

8. A process according to claim 6 wherein there are employed 30 to 50 l/h of an aqueous 0.5 molar hydrogen peroxide solution, and residual gas in an amount of 1,800 to 3,500 Nm$^3$/h.

9. A process according to claim 1 wherein the aqueous solution consists essentially of hydrogen peroxide and water and the solution obtained after contact with the residual gas has a pH of 0.9.

* * * * *